(12) United States Patent
Liu et al.

(10) Patent No.: US 9,761,346 B2
(45) Date of Patent: *Sep. 12, 2017

(54) METHOD OF PREPARING COPPER-BASED COMPOSITE CONDUCTIVE POWDER

(71) Applicant: Jianhong Liu, Shenzhen (CN)

(72) Inventors: Jianhong Liu, Shenzhen (CN); Qianling Zhang, Shenzhen (CN); Chuanxin He, Shenzhen (CN); Jian Xu, Shenzhen (CN); Xiangning Ren, Shenzhen (CN); Xiaoming Li, Shenzhen (CN); Chuhong Liao, Shenzhen (CN)

(73) Assignee: SHENZHEN EIGEN-EQUATION GRAPHENE TECHNOLOGY CO., LTD., Shenzhen (CN)

( * ) Notice: Subject to any disclaimer, the term of this patent is extended or adjusted under 35 U.S.C. 154(b) by 6 days.

This patent is subject to a terminal disclaimer.

(21) Appl. No.: 14/825,146

(22) Filed: Aug. 12, 2015

(65) Prior Publication Data
US 2017/0047140 A1   Feb. 16, 2017

(51) Int. Cl.
| | | |
|---|---|---|
| H01B 1/08 | (2006.01) | |
| B22F 9/24 | (2006.01) | |
| C09J 9/02 | (2006.01) | |
| C09D 133/20 | (2006.01) | |
| C08L 79/00 | (2006.01) | |
| C08F 220/44 | (2006.01) | |

(52) U.S. Cl.
CPC .............. *H01B 1/08* (2013.01); *B22F 9/24* (2013.01); *C08F 220/44* (2013.01); *C08L 79/00* (2013.01); *C09D 133/20* (2013.01); *C09J 9/02* (2013.01); *Y02E 60/12* (2013.01); *Y02E 60/122* (2013.01)

(58) Field of Classification Search
None
See application file for complete search history.

(56) References Cited

FOREIGN PATENT DOCUMENTS

| CN | 102169985 A | * | 8/2011 | ............. Y02E 60/12 |
|---|---|---|---|---|
| JP | 02190402 A | * | 7/1990 | |

OTHER PUBLICATIONS

English text machine translation of Liu et al. (CN 102169985 A), accessed on the Espacenet website, PDF pp. 1-12 attached to the case file.*

(Continued)

*Primary Examiner* — Katie L Hammer
(74) *Attorney, Agent, or Firm* — Matthias Scholl P.C.

(57) ABSTRACT

A method of preparing a copper-based composite conductive powder. The method includes: (1) preparing a liquid polyacrylonitrile (LPAN) solution, stirring the LPAN solution to yield a cyclized polyacrylonitrile solution; (2) heating the cyclized LPAN solution at between 200 and 300° C. for between 1 and 10 hrs to yield a thermally-oxidized polyacrylonitrile having a ladder structure; (3) adding the thermally-oxidized polyacrylonitrile and a copper compound to a solvent, and uniformly mixing, to yield a polyacrylonitrile coated copper compound; (4) drying the polyacrylonitrile coated copper compound to yield a carbonized precursor coated copper compound; and (5) calcining the carbonized precursor coated copper compound in the presence of an inert gas flow of between 10 and 500 mL/min for between 6 and 24 hrs at the temperature of between 300 and 1800° C.

8 Claims, 6 Drawing Sheets

(56) References Cited

OTHER PUBLICATIONS

English text machine translation of Ono et al. (JP 02-190402 A), accessed on the Espacenet website, PDF pp. 1-3 attached to the case file.*

JPO Abstract for Ono et al. (JP 02-190402 A), PDF attached to the case file.*

* cited by examiner

```
┌─────────────────────────────────────────────────────────┐
│ Preparing a liquid polyacrylonitrile (LPAN) solution,   │
│ stirring the LPAN solution at between 80 and 300°C for  │
│ between 8 and 72 hrs to yield a cyclized                │
│ polyacrylonitrile solution                              │
└─────────────────────────────────────────────────────────┘
                            ↓
┌─────────────────────────────────────────────────────────┐
│ Heating the cyclized LPAN solution at between 200 and   │
│ 300°C for between 1 and 10 hrs to yield a thermally-    │
│ oxidized polyacrylonitrile comprising a ladder structure│
└─────────────────────────────────────────────────────────┘
                            ↓
┌─────────────────────────────────────────────────────────┐
│ Adding the thermally-oxidized polyacrylonitrile and a   │
│ copper compound to a solvent, and uniformly mixing, to  │
│ yield a polyacrylonitrile coated copper compound        │
└─────────────────────────────────────────────────────────┘
                            ↓
┌─────────────────────────────────────────────────────────┐
│ Drying the polyacrylonitrile coated copper compound at  │
│ a temperature of between 180 and 250oC for between 1    │
│ and 10 hrs until the solvent is evaporated completely,  │
│ to yield a carbonized precursor coated copper compound  │
└─────────────────────────────────────────────────────────┘
                            ↓
┌─────────────────────────────────────────────────────────┐
│ Calcining the carbonized precursor coated copper        │
│ compound in the presence of an inert gas flow of        │
│ between 10 and 500 mL/min for between 6 and 24 hrs at   │
│ a temperature of between 300 and 1800oC, to yield a     │
│ copper-based composite conductive powder. The resulting │
│ copper-based composite conductive powder is coated with │
│ a carbon layer having a graphene structure              │
└─────────────────────────────────────────────────────────┘
```

FIG. 1

METHOD OF PREPARING COPPER-BASED COMPOSITE CONDUCTIVE POWDER

BACKGROUND OF THE INVENTION

Field of the Invention

The invention relates to a method of preparing a copper-based composite conductive powder.

Description of the Related Art

Typical conductive adhesive includes silver powder and copper powder. Silver powder is expensive but a good conductor. Copper powder, on the other hand, is cheap, but tends to oxidize, which leads to reduced electrical conductivity and shorter service life of the conductive adhesive.

SUMMARY OF THE INVENTION

In view of the above-described problems, it is one objective of the invention to provide a method of preparing a copper-based composite conductive powder that features oxidation resistance.

To achieve the above objective, in accordance with one embodiment of the invention, there is provided a method of preparing a copper-based composite conductive powder, the method comprising:

(1) preparing a liquid polyacrylonitrile (LPAN) solution, stirring the LPAN solution at between 80 and 300° C. for between 8 and 72 hrs to yield a cyclized polyacrylonitrile solution;

(2) heating the cyclized LPAN solution at between 200 and 300° C. for between 1 and 10 hrs to yield a thermally-oxidized polyacrylonitrile comprising a ladder structure;

(3) adding the thermally-oxidized polyacrylonitrile and a copper compound to a solvent, and uniformly mixing, to yield a polyacrylonitrile coated copper compound;

(4) drying the polyacrylonitrile coated copper compound at a temperature of between 180 and 250° C. for between 1 and 10 hrs until the solvent is evaporated completely, to yield a carbonized precursor coated copper compound; and (5) calcining the carbonized precursor coated copper compound in the presence of an inert gas flow of between 10 and 500 mL/min for between 6 and 24 hrs at a temperature of between 300 and 1800° C., to yield a copper-based composite conductive powder. The resulting copper-based composite conductive powder is coated with a carbon layer having a graphene structure.

In a class of this embodiment, in 1), a dopant is added to and uniformly mixed with the cyclized LPAN solution.

In a class of this embodiment, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

In a class of this embodiment, a solute of the LPAN solution is a liquid acrylonitrile oligomer with a relative molecular weight of between 106 and 100000, a solvent of the LPAN is water, methanol, alcohol, or a mixture thereof, and a mass concentration of the LPAN is between 0.01:1 and 0.08:1.

In a class of this embodiment, the liquid acrylonitrile oligomer is a homopolymer of acrylonitrile.

In a class of this embodiment, the liquid acrylonitrile oligomer is a copolymer of acrylonitrile and a vinyl monomer, and the vinyl monomer is selected from the group of styrene, methyl methacrylate, hydroxyethyl methylacrylate, acrylic acid, itaconic acid.

In a class of this embodiment, the copper compound is copper oxide or a copper salt.

In a class of this embodiment, based on mass ratio, a dosage ratio of the LPAN solution to the copper compound is between 0.05:1 and 2:1.

In a class of this embodiment, in (3), the mixing is achieved by stirring, ultrasound, or ball milling.

The invention also provides a copper-based composite conductive powder prepared using the method, and the powder is coated with a carbon layer having a graphene structure.

Advantages of the method of preparing a copper-based composite conductive powder according to embodiments of the invention are summarized as follows. The resulting copper-based composite conductive powder is coated with a carbon layer having a graphene structure, so that the oxidation resistance thereof is greatly improved. The graphene carbon layer structure can prevent the oxidation of the copper-based composite conductive powder and prevent the particle aggregation.

BRIEF DESCRIPTION OF THE DRAWINGS

The invention is described hereinbelow with reference to the accompanying drawings, in which:

FIG. 1 is a flow diagram of a method of preparing a copper-based composite conductive powder in accordance to one embodiment of the invention;

DETAILED DESCRIPTION OF THE EMBODIMENTS

Figure 2A:
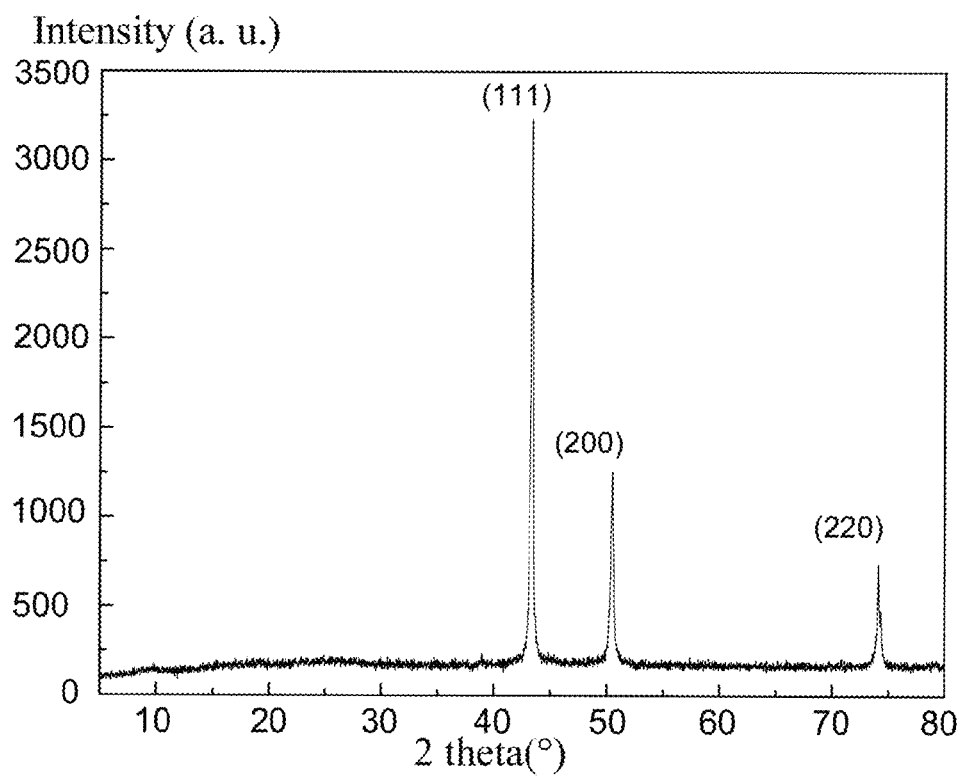
FIG. 2A is an XRD pattern of a copper-based composite conductive powder prepared in Example 1.

For further illustrating the invention, experiments detailing a method of preparing a copper-based composite conductive powder are described below. It should be noted that the following examples are intended to describe and not to limit the invention.

As shown in FIG. 1, a flow diagram of a method of preparing a copper-based composite conductive powder is provided. The method comprises:

(1) preparing a liquid polyacrylonitrile (LPAN) solution, stirring the LPAN solution at between 80 and 300° C. for between 8 and 72 hrs to yield a cyclized polyacrylonitrile solution;

(2) heating the cyclized LPAN solution at between 200 and 300° C. for between 1 and 10 hrs to yield a thermally-oxidized polyacrylonitrile comprising a ladder structure;

(3) adding the thermally-oxidized polyacrylonitrile and a copper compound to a solvent, and uniformly mixing, to yield a polyacrylonitrile coated copper compound;

(4) drying the polyacrylonitrile coated copper compound at a temperature of between 180 and 250° C. for between 1 and 10 hrs until the solvent is evaporated completely, to yield a carbonized precursor coated copper compound; and (5) calcining the carbonized precursor coated copper compound in the presence of an inert gas flow of between 10 and 500 mL/min for between 6 and 24 hrs at a temperature of between 300 and 1800° C., to yield a copper-based composite conductive powder. The resulting copper-based composite conductive powder is coated with a carbon layer having a graphene structure.

In (1), the liquid LPAN solution is stirred at the temperature of between 80 and 300° C. for between 8 and 72 hrs to yield the cyclized polyacrylonitrile solution. As a result, the linear LPAN molecule is transformed into a thermostable ladder structure, which can resist the pyrolysis during the high-temperature carbonization, thereby ensuring the high carbon residue rate and stable physicochemical properties. In the end, a carbon layer having a grapheme-like structure is formed.

Preferably, a solute of the LPAN solution is a liquid acrylonitrile oligomer with a relative molecular weight of between 106 and 100000, particularly, between 150 and 25000; a solvent of the LPAN is water, methanol, alcohol, or a mixture thereof, and a mass concentration of the LPAN is between 0.01:1 and 0.08:1.

Preferably, the liquid acrylonitrile oligomer is a copolymer of acrylonitrile and a vinyl monomer, and the vinyl monomer is selected from the group of styrene, methyl methacrylate, hydroxyethyl methylacrylate, acrylic acid, itaconic acid.

Preferably, in 1), a dopant is added to and uniformly mixed with the cyclized LPAN solution. The mixing mode is stirring, ultrasound, or ball milling.

Preferably, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

Based on mass ratio, a dosage ratio of the dopant to the LPAN solution is between 0.1:1 and 0.9:1, for example, 0.2:1, 0.3:1, 0.4:1, 0.5:1, 0.6:1, 0.7:1, 0.8:1 or 0.9:1.

In (2), the cyclized LPAN solution is heated at between 200 and 300° C. for between 1 and 10 hrs to yield the thermally-oxidized polyacrylonitrile (OPAN) comprising a ladder structure, so that the polyacrylonitrile can resist the pyrolysis during the high-temperature carbonization, thereby ensuring the high carbon residue rate and stable physicochemical properties.

In (3), the thermally-oxidized polyacrylonitrile and a copper compound are added to a solvent, and are uniformly mixed. As a result, a polyacrylonitrile-coated copper compound is formed, and the polyacrylonitrile on the surface thereof is crosslinked to form a solid, to yield a polyacrylonitrile-coated copper compound, i.e., LPAN coated copper compound.

The copper compound is copper oxide or a copper salt, the solvent is hydrophilic or hydrophobic, such as methanol, alcohol, decanol or deionized water. During mixing, the liquid polyacrylonitrile is coated on the copper compound, and the polyacrylonitrile on the surface thereof is crosslinked to form a solid, to yield a polyacrylonitrile-coated copper compound.

The particle size of the copper compound is between 8 nm and 100 µm. Based on mass ratio, a dosage ratio of the LPAN solution to the copper compound is between 0.05:1 and 2:1.

In (3), the mixing is achieved by stirring, ultrasound, or ball milling. The cyclized LPAN solution has multiple functional groups, which are adapted to tightly bind to the copper compound. Part of LPAN functional groups can coordinate with the conductive powder to achieve compatibility in the molecular level.

In (4), the polyacrylonitrile coated copper compound at a temperature of between 180 and 250° C. for between 1 and 10 hrs until the solvent is evaporated completely, to yield the carbonized precursor coated copper compound.

When the copper compound is copper oxide, the polyacrylonitrile coated copper compound is a precursor of copper oxide and a doping derivative thereof.

In (5), the carbonized precursor coated copper compound is calcined in the presence of an inert gas flow of between 10 and 500 mL/min for between 6 and 24 hrs at a temperature of between 300 and 1800° C., as a result, the cyclized polyacrylonitrile solution forms a grapheme-like structure coating on the surface of the copper compound particles, thereby yielding a copper-based composite conductive powder. The inert gas is nitrogen or argon.

Preferably, the calcination temperature is between 700 and 1400° C., so that the cyclized polyacrylonitrile solution forms a grapheme-like structure which is uniformly distributed in the conductive powder.

The invention also provides a copper-based composite conductive powder coated with a carbon layer having a graphene structure. The powder is prepared according to the above mentioned method and has high oxidation resistance, and can be used in the fields of chemical conductive paste, conductive adhesive, catalyst, biomedical science, microelectronics, electromagnetism, tribology, and the like.

Example 1

Figure 2B:
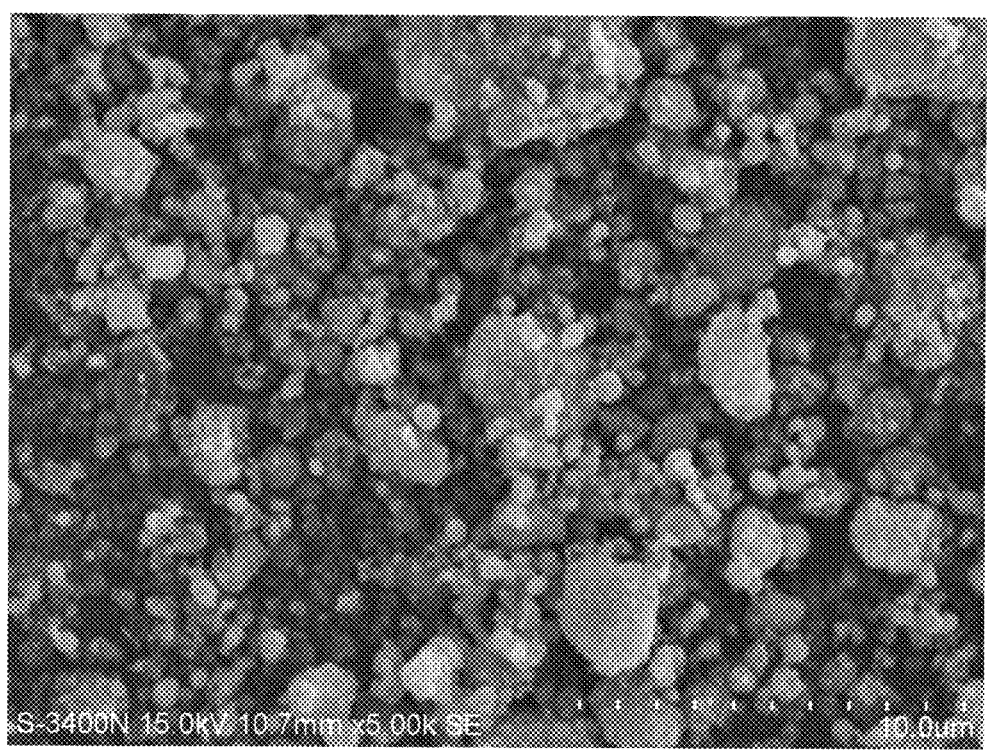
FIG. 2B is a SEM pattern of a copper-based composite conductive powder prepared in Example 1.
Figure 2C:
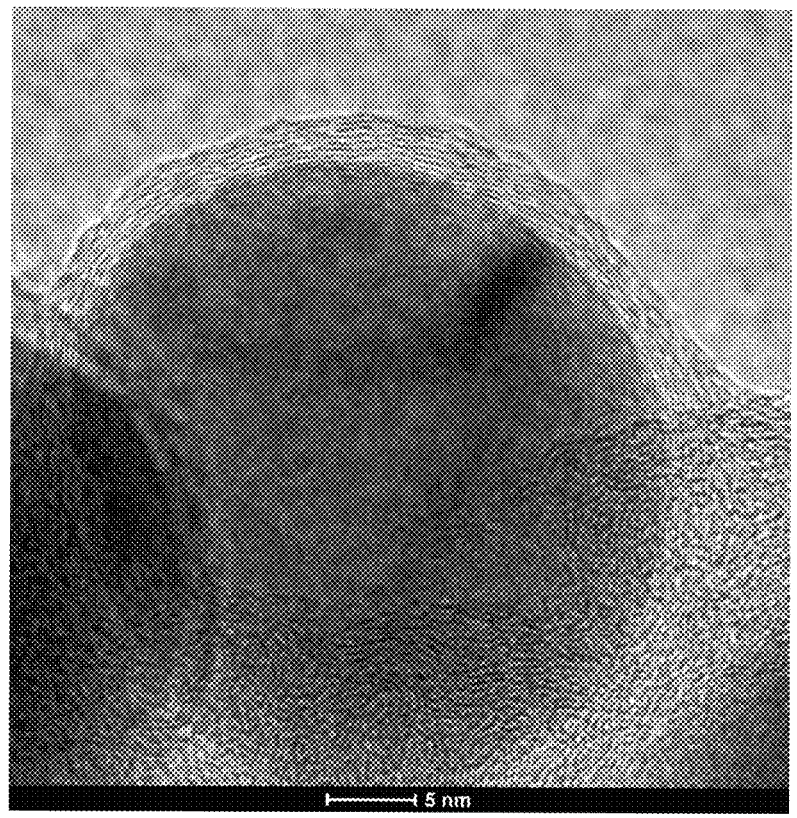
FIG. 2C is a TEM pattern of a copper-based composite conductive powder prepared in Example 1.
Figure 2D:
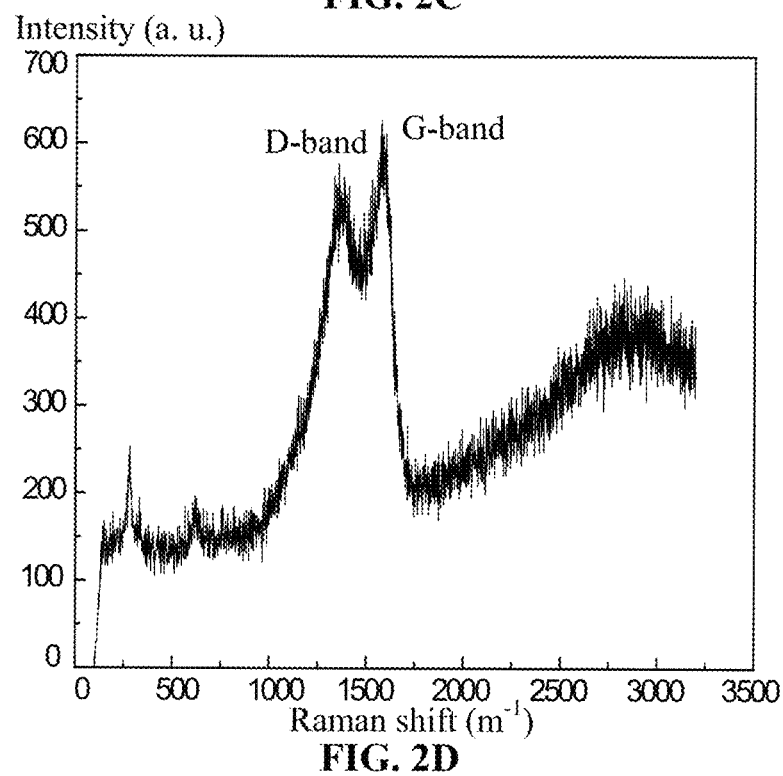
FIG. 2D is a Raman pattern of a copper-based composite conductive powder prepared in Example 1.

8.0 g of liquid polyacrylonitrile (LPAN) solution (molecular weight of 4000, mass percent of 80%) was stirred at 120° C. for 60 hrs, to yield a cyclized polyacrylonitrile solution. The cyclized LPAN solution was heated at 220° C. for 8 hrs to yield a thermally-oxidized polyacrylonitrile (OPAN) comprising a ladder structure. The thermally-oxidized polyacrylonitrile was mixed with 7.5 g of copper oxide powder and 30 mL of a solvent (water). The resulting mixture was ball milled using a planetary type ball mill for 10 hrs (400 rad/min), and the ratio of grinding media to material was 15:1. Thereafter, a product was collected and dried in an oven at 220° C. for 3 hrs, to yield a thermally-oxidized precursor (that is, low temperature carbonized precursor coated copper compound). The thermally-oxidized precursor was calcined in a ceramic boat in the presence of an inert gas flow of 250 mL/min for 6 hrs at the temperature of 1000° C., and then was cooled to room temperature, to yield a copper-based composite conductive powder coated with a carbon layer having a graphene structure, the structures thereof are shown in FIGS. 2A-2D. FIG. 2A is an XRD pattern of the copper-based composite conductive powder. FIG. 2B is a SEM pattern of the copper-based composite conductive powder. FIG. 2C is a TEM pattern of the copper-based composite conductive powder. FIG. 2D is a Raman pattern of the copper-based composite conductive powder.

Example 2

Figure 3A:
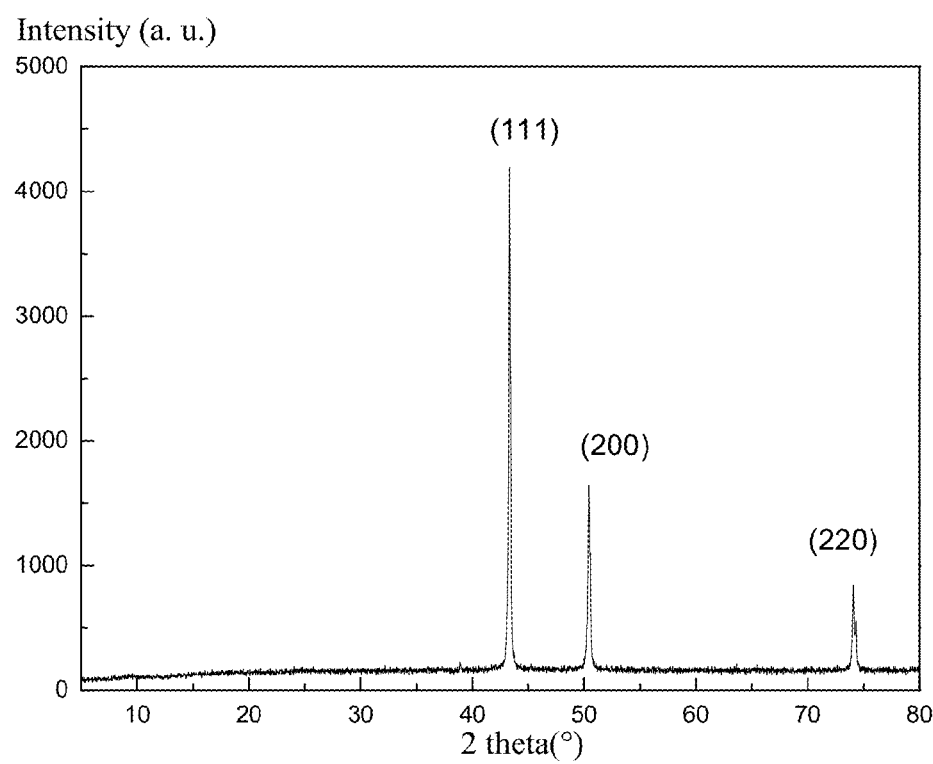
FIG. 3A is an XRD pattern of a copper-based composite conductive powder prepared in Example 2.
Figure 3B:
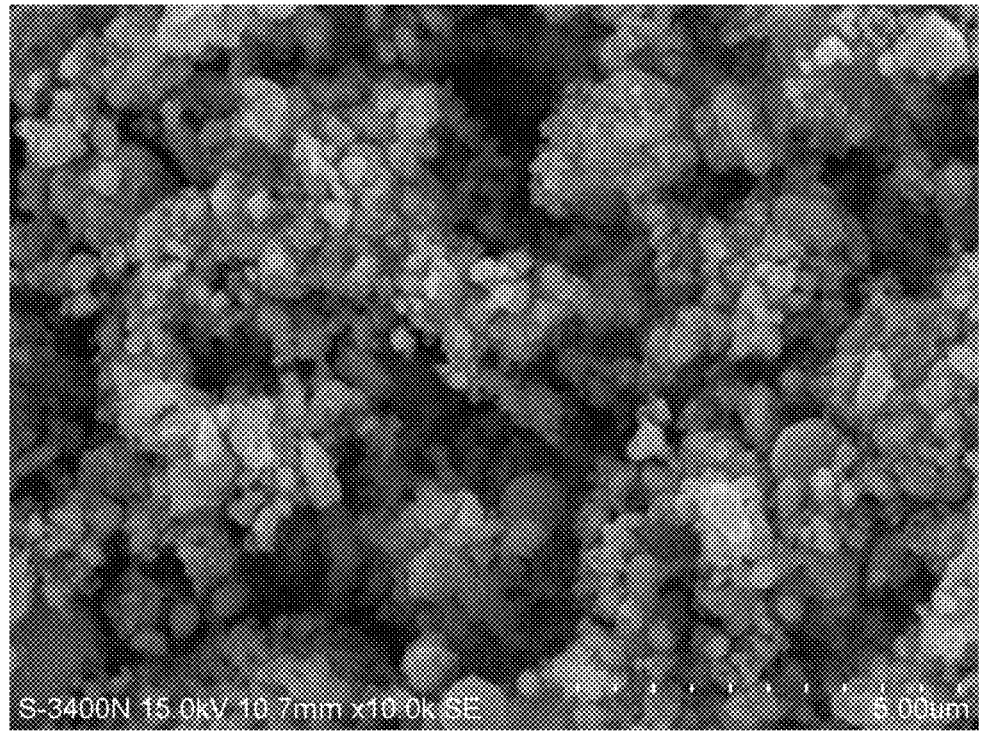
FIG. 3B is a SEM pattern of a copper-based composite conductive powder prepared in Example 2.
Figure 3C:
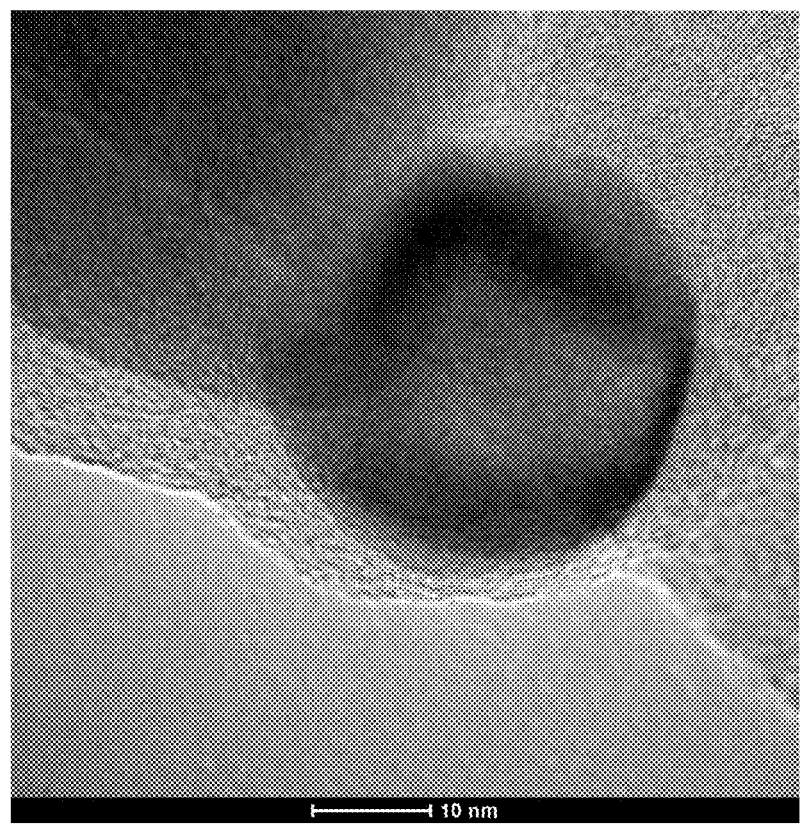
FIG. 3C is a TEM pattern of a copper-based composite conductive powder prepared in Example 2.
Figure 3D:
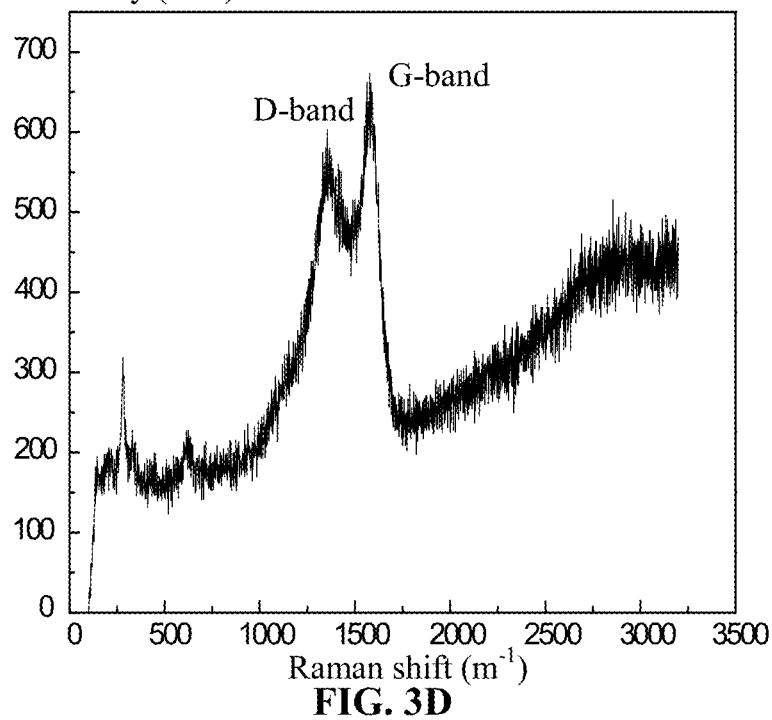
FIG. 3D is a Raman pattern of a copper-based composite conductive powder prepared in Example 2.

10.0 g of liquid polyacrylonitrile (LPAN) solution (molecular weight of 2500, mass percent of 50%) was stirred at 80° C. for 72 hrs, to yield a cyclized polyacrylonitrile solution. The cyclized LPAN solution was heated at 200° C. for 10 hrs to yield a thermally-oxidized polyacrylonitrile (OPAN) comprising a ladder structure. The thermally-oxidized polyacrylonitrile was mixed with 4.0 g of copper oxide powder and 15 mL of a solvent (methanol). The resulting mixture was ball milled using a planetary type ball mill for 10 hrs (400 rad/min), and the ratio of grinding media to material was 15:1. Thereafter, a product was collected and dried in an oven at 180° C. for 10 hrs, to yield a thermally-oxidized precursor (that is, low temperature carbonized precursor coated copper compound). The thermally-oxidized precursor was calcined in a ceramic boat in the presence of an inert gas flow of 10 mL/min for 15 hrs at the temperature of 1800° C., and then was cooled to room temperature, to yield a copper-based composite conductive powder coated with a carbon layer having a graphene structure, the structures thereof are shown in FIGS. 3A-3D. FIG. 3A is an XRD pattern of the copper-based composite conductive powder. FIG. 3B is a SEM pattern of the copper-based composite conductive powder. FIG. 3C is a TEM pattern of the copper-based composite conductive powder. FIG. 3D is a Raman pattern of the copper-based composite conductive powder. 1.8 g of the product, 2.5 g of silver flake, 1.6 g of polyurethane, 3.5 g of polyester, 0.4 g of a solvent, 0.2 g of a curing agent were uniformly mixed and printed to yield a thin film circuit with a thickness of 7 μm. The thin film was roasted at 135° C. for 1 minute, and the measured resistance was 427 ohm; after 30 minutes, the measured resistance was 493 ohm. So, even by high temperature roasting, the resistance variation of the thin film circuit is basically unchanged.

Example 3

Figure 4A:
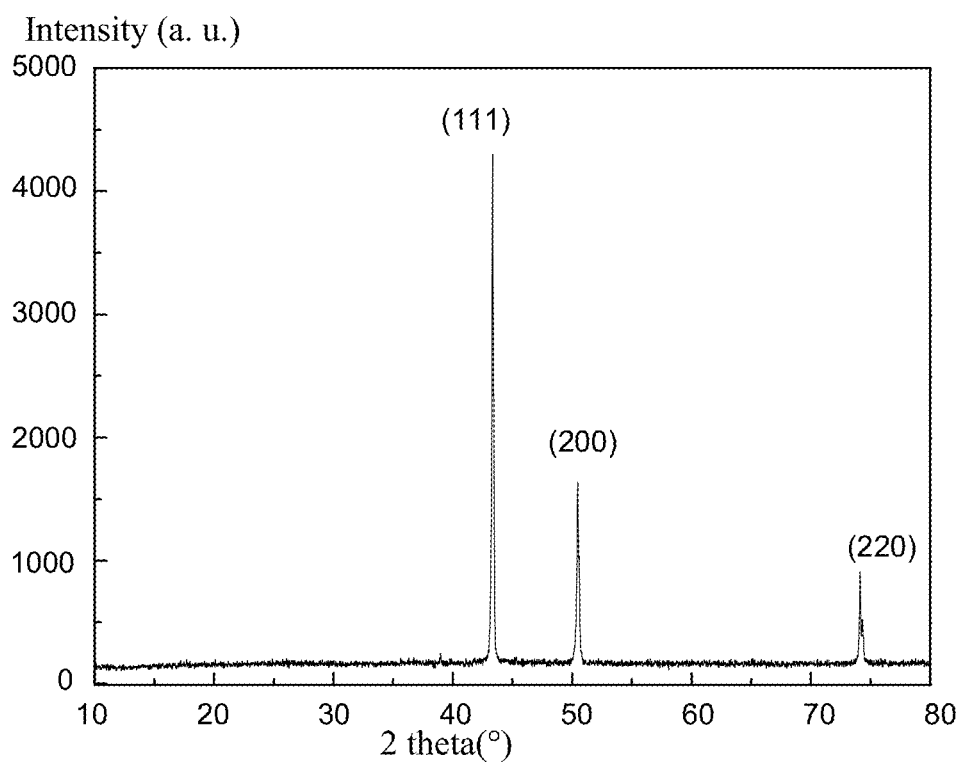
FIG. 4A is an XRD pattern of a copper-based composite conductive powder prepared in Example 3.
Figure 4B:
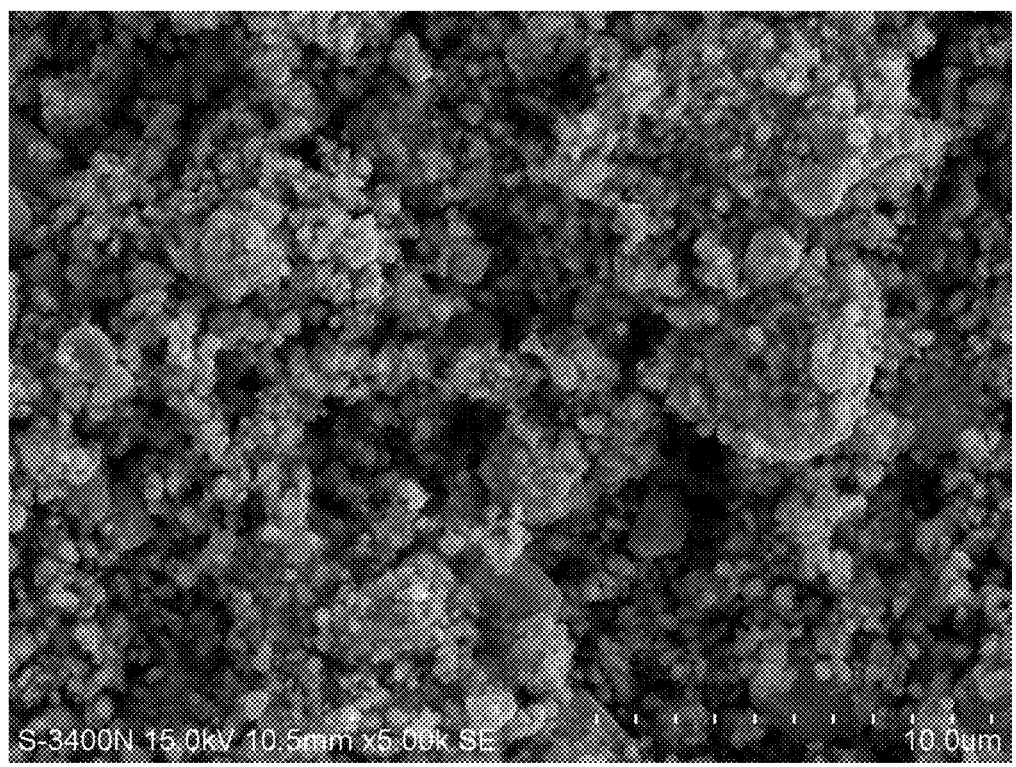
FIG. 4B is a SEM pattern of a copper-based composite conductive powder prepared in Example 3.

10.0 g of liquid polyacrylonitrile (LPAN) solution (molecular weight of 150, mass percent of 20%) was stirred at 300° C. for 8 hrs, to yield a cyclized polyacrylonitrile solution. The cyclized LPAN solution was heated at 300° C. for 1 hr to yield a thermally-oxidized polyacrylonitrile (OPAN) comprising a ladder structure. The thermally-oxidized polyacrylonitrile was mixed with 4.0 g of copper oxide powder and 20 mL of a solvent (ethanol). The resulting mixture was ball milled using a planetary type ball mill for 10 hrs (400 rad/min), and the ratio of grinding media to material was 15:1. Thereafter, a product was collected and dried in an oven at 250° C. for 1 hr, to yield a thermally-oxidized precursor (that is, low temperature carbonized precursor coated copper compound). The thermally-oxidized precursor was calcined in a ceramic boat in the presence of an inert gas flow of 500 mL/min for 24 hrs at the temperature of 1300° C., and then was cooled to room temperature, to yield a copper-based composite conductive powder coated with a carbon layer having a graphene structure, the structures thereof are shown in FIGS. 4A-4B. FIG. 4A is an XRD pattern of the copper-based composite conductive powder. FIG. 4B is a SEM pattern of the copper-based composite conductive powder. 1.8 g of the product, 2.5 g of silver flake, 1.6 g of polyurethane, 3.5 g of polyester, 0.4 g of a solvent, 0.2 g of a curing agent were uniformly mixed and printed to yield a thin film circuit with a thickness of 8 μm. The thin film was roasted at 135° C. for 1 minute, and the measured resistance was 488 ohm; after 30 minutes, the measured resistance was 542 ohm. So, even by high temperature roasting, the resistance variation of the thin film circuit is basically unchanged.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing a graphene-coated copper-based composite conductive powder, the method comprising:
    (1) preparing a liquid polyacrylonitrile (LPAN) solution, stirring the LPAN solution at between 80 and 300° C. for between 8 and 72 hrs to yield a cyclized polyacrylonitrile solution;
    (2) heating the cyclized LPAN solution at between 200 and 300° C. for between 1 and 10 hrs to yield a thermally-oxidized polyacrylonitrile;
    (3) adding the thermally-oxidized polyacrylonitrile and a copper compound to a solvent, and uniformly mixing, to yield a thermally-oxidized polyacrylonitrile-coated copper compound;
    (4) drying the thermally-oxidized polyacrylonitrile-coated copper compound at a temperature of between 180 and 250° C. for between 1 and 10 hrs, to yield a carbonized precursor-coated copper compound; and
    (5) calcining the carbonized precursor-coated copper compound in the presence of an inert gas flow of between 10 and 500 mL/min for between 6 and 24 hrs at a temperature of between 300 and 1800° C., to yield a graphene-coated copper-based composite conductive powder;

wherein
the copper compound is copper oxide.

2. The method of claim 1, wherein in (1), a dopant is added to and uniformly mixed with the cyclized LPAN solution.

3. The method of claim 2, wherein the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, or a mixture thereof; and the non-metallic dopant is silicon, phosphorus, boron, nitrogen, carbon, sulfur, or a compound thereof, or a mixture thereof.

4. The method of claim 1, wherein in (1), a solute of the LPAN solution is a liquid acrylonitrile oligomer with a relative molecular weight of between 106 and 100000, a solvent of the LPAN solution is water, methanol, alcohol, or a mixture thereof, and a mass concentration of the LPAN solution is between 0.01:1 and 0.08:1.

5. The method of claim 4, wherein the liquid acrylonitrile oligomer is a homopolymer of acrylonitrile.

6. The method of claim 4, wherein the liquid acrylonitrile oligomer is a copolymer of acrylonitrile and a vinyl monomer, and the vinyl monomer is styrene, methyl methacrylate, hydroxyethyl methylacrylate, acrylic acid, or itaconic acid.

7. The method of claim 1, wherein in (3), a mass ratio of the LPAN solution to the copper compound is between 0.05:1 and 2:1.

8. The method of claim 1, wherein in (3), the mixing is achieved by stirring, ultrasound, or ball milling.

* * * * *